US 9,334,008 B2

(12) United States Patent
Murayama (10) Patent No.: US 9,334,008 B2
(45) Date of Patent: May 10, 2016

(54) STRADDLE-TYPE VEHICLE

(71) Applicant: YAMAHA HATSUDOKI KABUSHIKI KAISHA, Iwata-shi, Shizuoka (JP)

(72) Inventor: Yuki Murayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/205,680

(22) Filed: Mar. 12, 2014

(65) Prior Publication Data

US 2014/0262582 A1 Sep. 18, 2014

(30) Foreign Application Priority Data

Mar. 15, 2013 (JP) ................... 2013-053285

(51) Int. Cl.
*B62K 11/02* (2006.01)
*B62M 7/02* (2006.01)
*B62K 11/04* (2006.01)

(52) U.S. Cl.
CPC ................ *B62K 11/02* (2013.01); *B62K 11/04* (2013.01); *B62M 7/02* (2013.01)

(58) Field of Classification Search
CPC .......... B62K 11/02; B62K 11/04; F01N 1/08; F01N 1/10
USPC ....................................... 180/219
See application file for complete search history.

(56) References Cited

U.S. PATENT DOCUMENTS

| 6,438,949 | B1 * | 8/2002 | Nozaki ........................... 60/322 |
| 7,438,149 | B2 * | 10/2008 | Ishida et al. .................. 180/227 |
| 7,669,687 | B2 * | 3/2010 | Takahashi et al. ............ 180/309 |
| 2006/0283650 | A1 * | 12/2006 | Kawamura et al. .......... 180/227 |
| 2007/0227810 | A1 * | 10/2007 | Sakurai et al. ................ 181/251 |
| 2008/0121455 | A1 * | 5/2008 | Ishida .......................... 180/219 |
| 2010/0032226 | A1 * | 2/2010 | Yokoi ........................... 180/229 |
| 2012/0031698 | A1 * | 2/2012 | Inoue et al. .................. 181/252 |

FOREIGN PATENT DOCUMENTS

| JP | 06-002876 Y2 * | 1/1994 |
| JP | 2006-307793 A | 11/2006 |
| JP | 2012-035714 A | 2/2012 |

* cited by examiner

*Primary Examiner* — Joseph Rocca
*Assistant Examiner* — Felicia L Brittman
(74) *Attorney, Agent, or Firm* — Keating and Bennett, LLP (57) ABSTRACT

A motorcycle includes an engine, a first main frame extending in top-to-bottom and front-to-rear directions with respect to the vehicle to support the engine, a first rear frame extending from the first main frame rearwardly with respect to the vehicle and connected with the first main frame in at least two locations, an exhaust pipe that discharges exhaust gases from the engine to the outside, and a silencer attached to a rear portion of the exhaust pipe, at least a portion of the silencer being located below the first rear frame. A rear portion of the silencer is connected with the first rear frame. At least one of a front portion of the silencer and the exhaust pipe is connected with the first main frame below the first rear frame.

11 Claims, 7 Drawing Sheets

STRADDLE-TYPE VEHICLE

BACKGROUND OF THE INVENTION

1. Field of the Invention

The present invention relates to straddle-type vehicles, and more particularly, to straddle-type vehicles with a rear frame extending from a main frame rearwardly with respect to the vehicle.

2. Description of the Related Art

Straddle-type vehicles include a main frame extending in top-to-bottom and front-to-rear directions with respect to the vehicle for supporting the engine, and a rear frame extending from the main frame rearwardly with respect to the vehicle. Typically, a rear frame must have a sufficient strength in order to provide a basic framework of a rear portion of the vehicle.

For example, the straddle-type vehicle disclosed in JP 2012-35714 A includes a rear frame composed of a seat pipe supporting the seat and a lower pipe located lower than the seat pipe for supporting the seat pipe. The seat pipe and the lower pipe each have one end connected with the main frame, while the other end of the seat pipe is connected with the other end of the lower pipe. The one end of the lower pipe is connected with the main frame at a location lower than the connection point between the one end of the seat pipe and the main frame.

In such an arrangement with a rear frame having a seat pipe (hereinafter referred to as upper frame) and lower pipe (hereinafter referred to as lower frame), the location where the upper frame is connected with the main frame must be sufficiently spaced apart in a top-to-bottom direction from the location where the lower frame is connected with the main frame in order to ensure a sufficient strength of the rear frame. Thus, the position of the lower frame as measured in a top-to-bottom direction relative to the upper frame is subject to constraints dictated by the desired strength of the rear frame. As such, the freedom of design of the rear frame is low.

Typically, a silencer is attached to the rear frame. For example, at least part of the silencer of an off-road vehicle is located below the rear frame in order to concentrate the mass of the vehicle as measured in a vehicle width direction and prevent the silencer from contacting the foot of the rider and contacting the rear wheel that swings while the vehicle is traveling. If the silencer is thus located, positioning the silencer closer to the center of gravity of the vehicle in order to concentrate the mass of the vehicle as measured in a front-to-rear direction with respect to the vehicle may cause the silencer to contact the lower frame, which is connected with the main frame lower than the upper frame. Thus, the location of the silencer is restricted by the construction of the rear frame.

Thus, a low freedom of design of the rear frame restricts the location of the silencer and other components, leading to a low freedom of design of the vehicle.

SUMMARY OF THE INVENTION

Preferred embodiments of the present invention provide a vehicle that has significantly improved freedom of design of a rear frame including an upper frame and a lower frame.

A straddle-type vehicle according to a preferred embodiment of the present invention includes an engine, a body frame supporting the engine, and an exhaust system that discharges exhaust gases from the engine to the outside, the body frame including a first main frame extending in top-to-bottom and front-to-rear directions with respect to the vehicle and a first rear frame extending from the first main frame rearwardly with respect to the vehicle and connected with the first main frame in at least two locations, the exhaust system including an exhaust pipe connected with the engine and a silencer attached to a rear portion of the exhaust pipe, at least a portion of the silencer being located below the first rear frame, a rear portion of the silencer being connected with the first rear frame, and at least one of a front portion of the silencer and the rear portion of the exhaust pipe being connected with the first main frame below the first rear frame.

In the straddle-type vehicle with this arrangement, the rear portion of the silencer is connected with the first rear frame, while at least one of the front portion of the silencer and the rear portion of the exhaust pipe is connected with the main frame below the first rear frame. Thus, the silencer, or the silencer together with the exhaust pipe (hereinafter referred to as "silencer etc.") reinforces the first rear frame. This improves the freedom of design of the first rear frame.

In a straddle-type vehicle according to a preferred embodiment of the present invention, the front portion of the silencer is connected with the first main frame.

Since in the straddle-type vehicle with this arrangement, the front portion of the silencer is connected with the first main frame, the front and rear portions of the silencer are connected with the body frame. Thus, the silencer is directly connected with the body frame at its front and rear portions. Consequently, the silencer, which is one structure, reinforces the first rear frame in a more reliable manner. This reinforces the first rear frame more reliably.

In a straddle-type vehicle according to a preferred embodiment of the present invention, the rear portion of the exhaust pipe is connected with the first main frame.

Since in the straddle-type vehicle with this arrangement, the rear portion of the exhaust pipe is connected with the first main frame, the rear portion of the exhaust pipe and the rear portion of the silencer are connected with the body frame. Thus, the exhaust pipe, which has a higher freedom of layout than the silencer, is connected with the first main frame such that the silencer and exhaust pipe reinforce for the first rear frame. This makes it possible to reinforce the first rear frame while providing flexibility in the layout of the exhaust system.

In a straddle-type vehicle according to a preferred embodiment of the present invention, a top surface of the rear portion of the silencer is connected with the first rear frame, and a bottom surface of at least one of the front portion of the silencer and the rear portion of the exhaust pipe is connected with the first main frame.

In the straddle-type vehicle with this arrangement, the top surface of the rear portion of the silencer is connected with the first rear frame, and the bottom surface of at least one of the front portion of the silencer and the rear portion of the exhaust pipe is connected with the first main frame. As such, the silencer etc. are supported at top and bottom surfaces thereof. This improves the support rigidity for the silencer etc., thus preventing the silencer etc. from being displaced in a top-to-bottom direction with respect to the vehicle and in a vehicle width direction while the straddle-type vehicle is traveling. This allows the silencer etc. to follow the behavior of the entire straddle-type vehicle without delay, thus improving the handling feel of the vehicle.

A straddle-type vehicle according to a preferred embodiment of the present invention includes a support bracket that supports the bottom surface of at least one of the front portion of the silencer and the rear portion of the exhaust pipe from below and connecting the same with the first main frame.

In the straddle-type vehicle with this arrangement, the support bracket supports the bottom surface of at least one of the front portion of the silencer and the rear portion of the exhaust pipe. Thus, the support bracket receives a load or moment acting lower portions of the front portion of the silencer and the rear portion of the exhaust pipe in a more reliable manner, and the support rigidity for the silencer etc. is improved.

In a straddle-type vehicle according to a preferred embodiment of the present invention, the silencer includes a cylindrical external cylinder body, and a diffuser provided at the front portion of the silencer that connects a front portion of the external cylinder body with the exhaust pipe, the diffuser being connected with the first main frame.

In the straddle-type vehicle with this arrangement, the diffuser is connected with the first main frame. This makes it possible to concentrate the mass of the vehicle in a vehicle width direction and in a front-to-rear direction with respect to the straddle-type vehicle, reduce the possibility of the exhaust system contacting the foot of the rider and improve the discharge performance of the exhaust system.

A straddle-type vehicle according to a preferred embodiment of the present invention includes a rear support member located between the rear portion of the silencer and the first rear frame to support the exhaust system on the first rear frame, and a front support member located between at least one of the front portion of the silencer and the rear portion of the exhaust pipe and the first main frame to support the exhaust system on the first main frame, the front and rear support members being located, as viewed from above the vehicle, between an inner side line of the silencer close to the centerline of the vehicle and an outer side line thereof opposite the inner side line, the inner and outer side lines being arranged in a vehicle width direction, the front support member being located closer to the outer side line than the inner side line, and the rear support member being located closer to the inner side line than the outer side line.

In the straddle-type vehicle with this arrangement, the front support member is located closer to the outer side line of the silencer than the inner sideline thereof, and the rear support member is located closer to the inner side line of the silencer than the outer side line thereof. Thus, the silencer etc. are supported at both sides thereof disposed in a vehicle width direction. This improves the support rigidity for the silencer etc., thus preventing the silencer etc. from being displaced significantly in a vehicle width direction while the straddle-type vehicle is traveling. This allows the silencer etc. to follow the behavior of the entire straddle-type vehicle without delay, thus improving the handling feel of the straddle-type vehicle.

As used herein, "located . . . between an inner side line of the silencer close to the centerline of the vehicle and an outer side line thereof opposite the inner side line such that the inner and outer side lines are arranged in a vehicle width direction" includes the front support member being located on the inner side line of the silencer and the rear support member being located on the outer side line of the silencer.

In a straddle-type vehicle according to a preferred embodiment of the present invention, the first rear frame includes a first upper frame extending from the first main frame rearwardly with respect to the vehicle, and a first lower frame located below the first upper frame and extending from the first main frame rearwardly with respect to the vehicle to be connected with a rear portion of the first upper frame.

In the straddle-type vehicle with this arrangement, the first rear frame includes the first upper frame and the first lower frame. Thus, the first rear frame is implemented by a simple arrangement.

In a straddle-type vehicle according to a preferred embodiment of the present invention, the body frame further includes a second main frame located such that the first and second main frames are arranged in a vehicle width direction, the second main frame extending in top-to-bottom and front-to-rear directions with respect to the vehicle to support the engine, and a second rear frame located such that the first and second rear frames are arranged in a vehicle width direction, the second rear frame extending from the second main frame rearwardly with respect to the vehicle and connected with the second main frame in at least two locations, the second rear frame including a second upper frame extending from the second main frame rearwardly with respect to the vehicle, and a second lower frame located below the second upper frame and extending from the second main frame rearwardly with respect to the vehicle and connected with a rear portion of the second upper frame, and at least a portion of the first lower frame being located higher than the second lower frame as viewed from a side of the vehicle.

In the straddle-type vehicle with this arrangement, the body frame includes the second main frame and the second rear frame including the second upper frame and the second lower frame, at least a portion of the first lower frame being located higher than the second lower frame as viewed from a side of the vehicle. In this arrangement, the first and second rear frames are in an asymmetrical arrangement. As such, a space in which the silencer may be disposed may be provided below the first lower frame.

In a straddle-type vehicle according to a preferred embodiment of the present invention, the silencer is positioned so as to overlap at least a portion of the second lower frame as viewed from a side of the vehicle.

In the straddle-type vehicle with this arrangement, the silencer is positioned so as to overlap at least a portion of the second lower frame as viewed from a side of the vehicle. This allows the silencer to be positioned more forward than in implementations where the first and second lower frames are in a symmetrical position with respect to the lengthwise centerline of the vehicle. This allows the mass of the straddle-type vehicle to be concentrated as measured in a front-to-rear direction with respect to the vehicle.

In a straddle-type vehicle according to a preferred embodiment of the present invention, a portion of the exhaust system is located rearward of the engine and extends rearward with respect to the vehicle between the first and second main frames, and the silencer is gradually separated from the vehicle centerline extending in a front-to-rear direction with respect to the vehicle, beginning from the front portion of the silencer toward the rear portion thereof, such that the silencer does not overlap the rear wheel as viewed from above the vehicle.

In the straddle-type vehicle with this arrangement, a portion of the exhaust system is located rearward of the engine and extends rearward with respect to the vehicle between the first and second main frames, and the silencer is disposed so as not to overlap the rear wheel as viewed from above the vehicle. This makes it possible to prevent the silencer from contacting the rear wheel and prevent the exhaust system from contacting the foot of the rider, and to concentrate the mass of the straddle-type vehicle as measured in a vehicle width direction.

In a straddle-type vehicle according to a preferred embodiment of the present invention, the first lower frame has a smaller cross section in a vehicle width direction than the second lower frame.

In a straddle-type vehicle according to a preferred embodiment of the present invention, the first lower frame has at least one of a smaller rigidity and a smaller strength than the second lower frame.

In a straddle-type vehicle with one or more of these arrangements, the silencer etc. reinforce the first rear frame. This improves the freedom of design of the straddle-type vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Now, preferred embodiments will be described with reference to the drawings. The sizes of the components in the drawings do not exactly represent the sizes or size ratios of the actual components.

Figure 1:
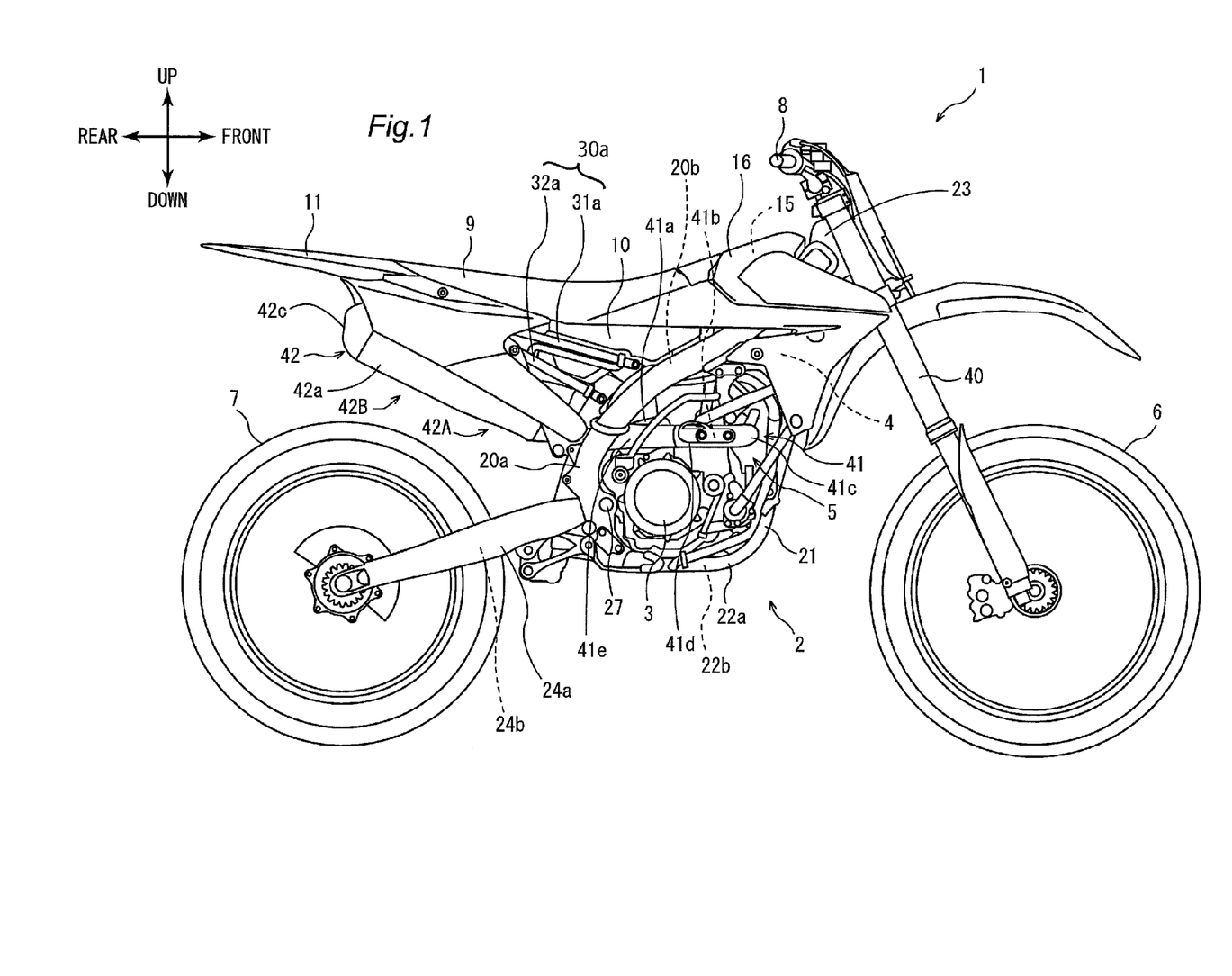
FIG. 1 is a schematic right side view of a motorcycle according to a preferred embodiment of the present invention.

FIG. 1 is a schematic right side view of a motorcycle (i.e. the straddle-type vehicle) 1. The motorcycle 1 preferably is a motocrosser designed to travel on an irregular terrain, for example. The motorcycle 1 includes a body frame 2, an engine 3, an air-intake system 4, an exhaust system 5, a front wheel 6, a rear wheel 7, handlebars 8, a seat 9, and a fuel tank 10. In the description below, "front/forward", "rear(ward)", "left" and "right" mean such directions as perceived by a rider holding the handlebars 8 and sitting on the seat 9 of the motorcycle 1.

Figure 2:
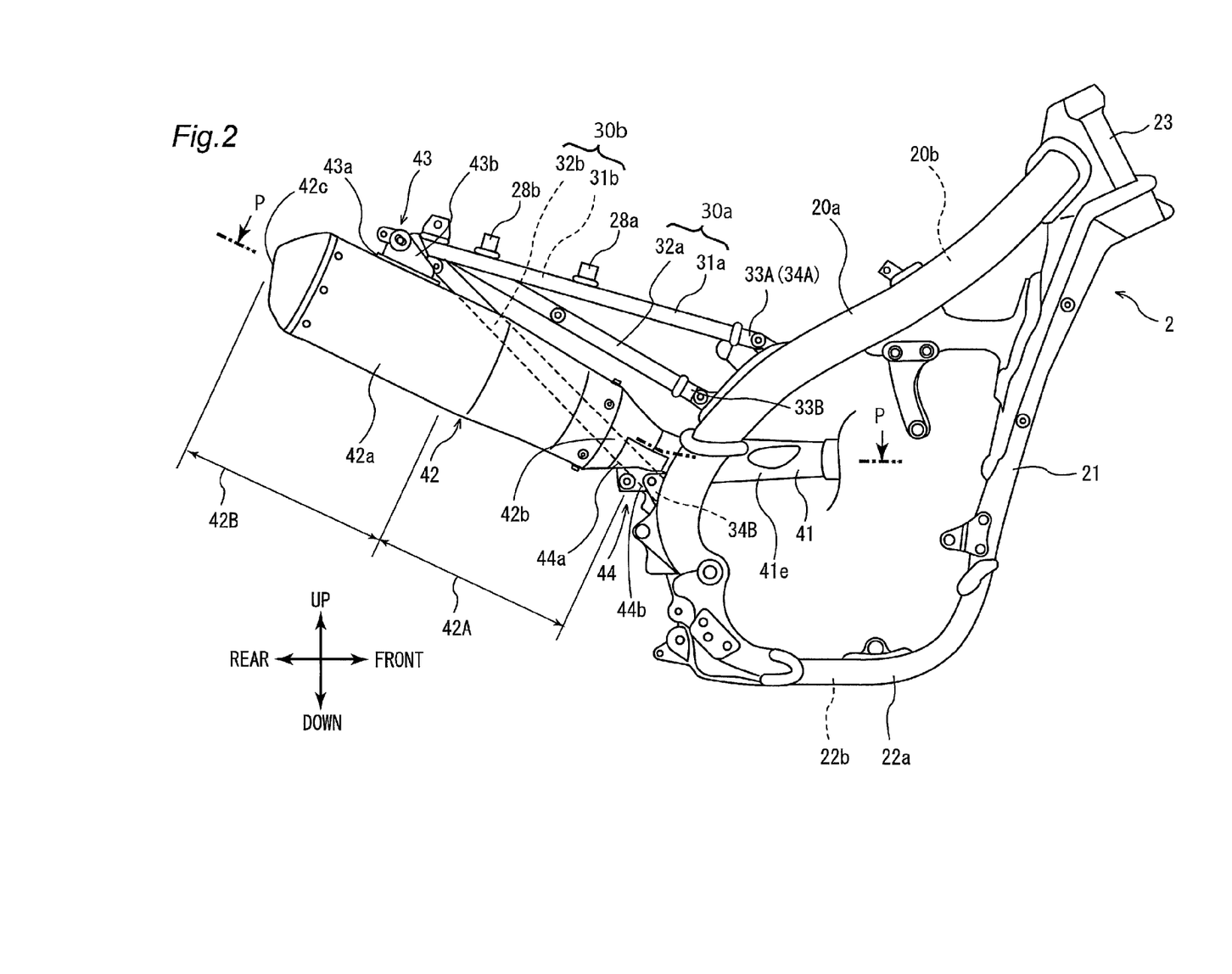
FIG. 2 is a right side view of the body frame, showing the position of the silencer relative to the body frame.
Figure 3:
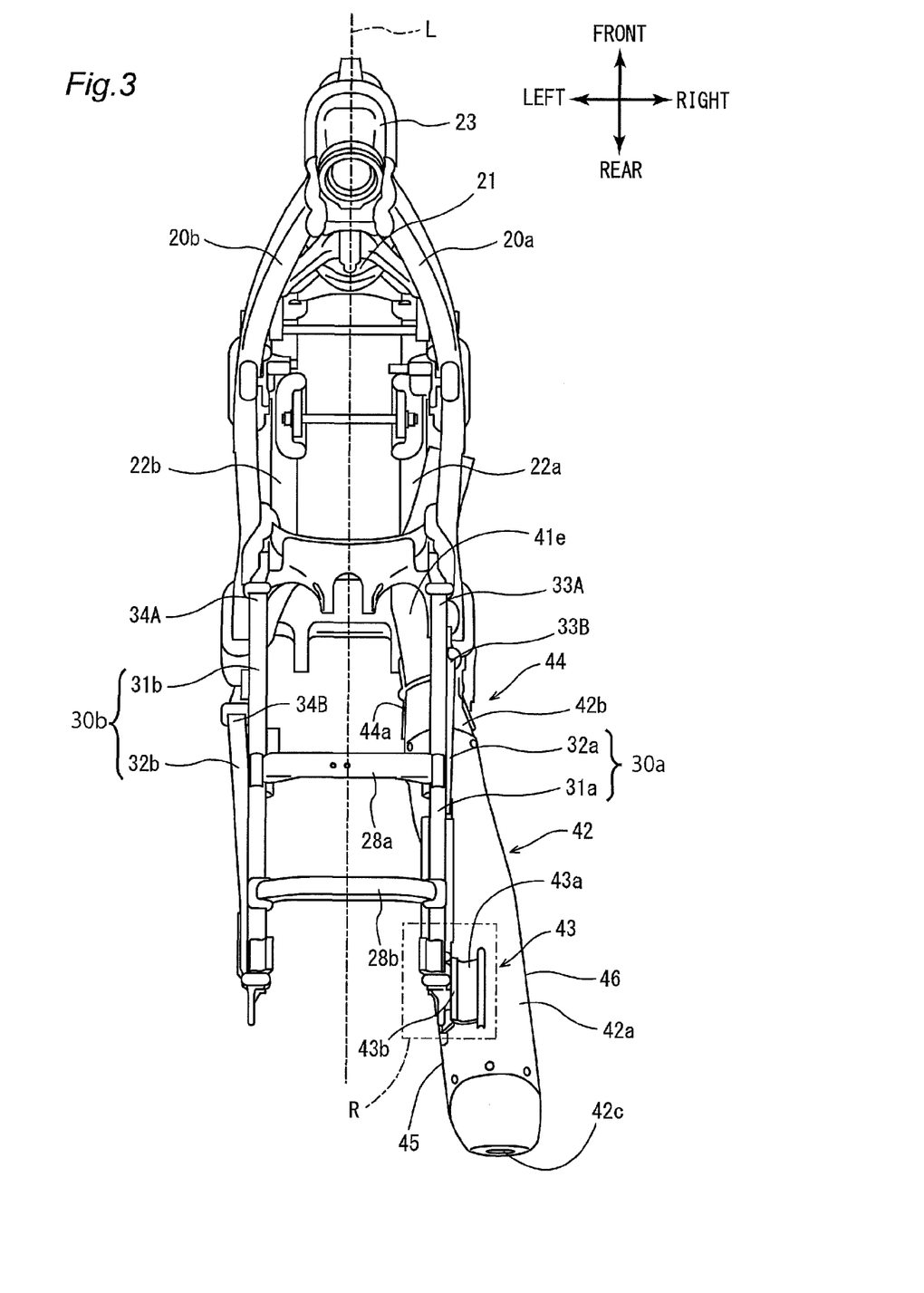
FIG. 3 is a plan view of the body frame, showing the position of the silencer relative to the body frame.

FIG. 2 shows the body frame 2 as viewed from the right side. FIG. 3 shows the body frame 2 as viewed from above. "L" in FIG. 3 indicates a vehicle centerline, extending in a front-to-rear direction with respect to the vehicle.

The body frame 2 is a cradle frame supporting the engine 3. The body frame 2 includes a first main frame 20a and second main frame 20b, a down frame 21, a first bottom frame 22a and second bottom frame 22b, a head pipe 23, a pair of rear arms 24a and 24b, and a first rear frame 30a and second rear frame 30b.

As shown in FIGS. 1 to 3, the head pipe 23 is located at a front portion of the motorcycle 1.

As shown in FIG. 3, the first and second main frames 20a and 20b are arranged in a vehicle width direction (i.e. in a left-to-right direction). The first and second main frames 20a and 20b extend from the head pipe 23 obliquely downwardly toward the rear (see FIGS. 1 and 2).

As shown in FIG. 3, the first main frame 20a is located to the right with respect to the vehicle, while the second main frame 20b is located to the left with respect to the vehicle. Each of the first and second main frames 20a and 20b includes a front portion extending to be separated as it goes toward the rear of the vehicle, a central portion extending rearward while maintaining a generally constant distance, and a rear portion extending to be slightly separated as it goes toward the rear of the vehicle.

A pivot shaft 27 is provided at the bottom ends of the first and second main frames 20a and 20b (see FIG. 1).

As shown in FIGS. 1 and 2, the down frame 21 is connected with the head pipe 23 at a location below the first and second main frames 20a and 20b. The down frame 21 extends from the head pipe 23 downwardly and rearwardly.

As shown in FIGS. 1 and 2, the first bottom frame 22a connects the bottom end of the down frame 21 with the bottom end of the first main frame 20a. The second bottom frame 22b connects the bottom end of the down frame 21 with the bottom end of the second main frame 20b.

Thus, as shown in FIGS. 1 and 2, as viewed from a side of the vehicle, the head pipe 23, first main frame 20a, down frame 21 and first bottom frame 22a are connected to define a loop. Also, as viewed from aside of the vehicle, the head pipe 23, second main frame 20b, down frame 21 and second bottom frame 22b are connected to define a loop (see FIGS. 1 and 2).

As used herein, "as viewed from above the vehicle" and "as viewed from a side of the vehicle" are used to clarify the position of a described component, and include a view of a described component(s) from above (or a side of) the vehicle without (or through) other components covering all or part of the described component(s) or other components located between the described components.

The rear arms 24a and 24b are located on the right and left sides, respectively, of the vehicle (see FIG. 1). As the front ends of the rear arms 24a and 24b are attached to the pivot shaft 27, the rear arms are supported by the pivot shaft 27 so as to be swingable in a top-to-bottom direction. The rear wheel 7 is attached to the rear ends of the rear arms 24a and 24b so as to be sandwiched by these ends such that the rear arms and wheel are arranged in a vehicle width direction, and to be rotatable. A rear fender 11 is located above the rear wheel 7.

As shown in FIG. 3, the first rear frame 30a is located to the right with respect to the vehicle, while the second rear frame 30a is located to the left with respect to the vehicle. The first rear frame 30a includes front ends 33A and 33B connected with the first main frame 20a, and extends from the first main frame 20a rearwardly with respect to the vehicle. The second rear frame 30b includes front ends 34A and 34B connected with the second main frame 20b, and extends from the second main frame 20b rearwardly with respect to the vehicle.

The first and second rear frames 30a and 30b will be described in detail below.

As shown in FIG. 1, the handlebars 8 are rotatably connected with the top of a steering shaft (not shown) located in the head pipe 23. The front wheel 6 is rotatably attached to the bottom end of a front fork 40, which is disposed along the steering shaft.

An air cleaner 15, covered with the cover 16, is located rearward of the head pipe 23. A front portion of the seat 9 is located rearward of the air cleaner 15 and above the first and second main frames 20a and 20b. The seat 9 extends from behind the air cleaner 15 rearwardly with respect to the vehicle. The fuel tank 10 is located below the front portion of the seat 9.

The engine 3 is located below the first and second main frames 20a and 20b and rearward of the down frame 21. The engine 3 includes a front portion connected with an air-intake pipe (not shown) of the air-intake system 4 to introduce intake air from the air cleaner 15 into the engine 3, and a rear portion connected with an exhaust pipe 41 of the exhaust system 5. In other words, the motorcycle 1 takes air into the engine 3 from the front of the vehicle, and discharges gases from the engine 3 toward the rear of the vehicle.

The exhaust system 5 discharges exhaust gases from the engine 3 to the outside. The exhaust system 5 includes the exhaust pipe 41 and a silencer 42.

The exhaust pipe 41 has one end connected with a rear portion of the engine 3 and is disposed to surround the engine 3. More specifically, the exhaust pipe 41 includes a U-shaped or substantially U-shaped portion 41a extending from a rear portion of the engine 3 rearwardly with respect to the vehicle before being bent to extend toward the left and forward with respect to the vehicle, a left extending portion 41b extending forward with respect to the vehicle to pass to the left of the engine 3, a front extending portion 41c extending toward the right with respect to the engine 3 so as to pass anterior to the engine 3, a right extending portion 41d extending rearward with respect to the vehicle so as to pass to the right of the engine 3, and a rear extending portion (i.e. the rear portion of the exhaust pipe) 41e located rearward of the engine 3 with respect to the vehicle and extending from the right of the engine 3 rearwardly with respect to the vehicle.

Figure 4:
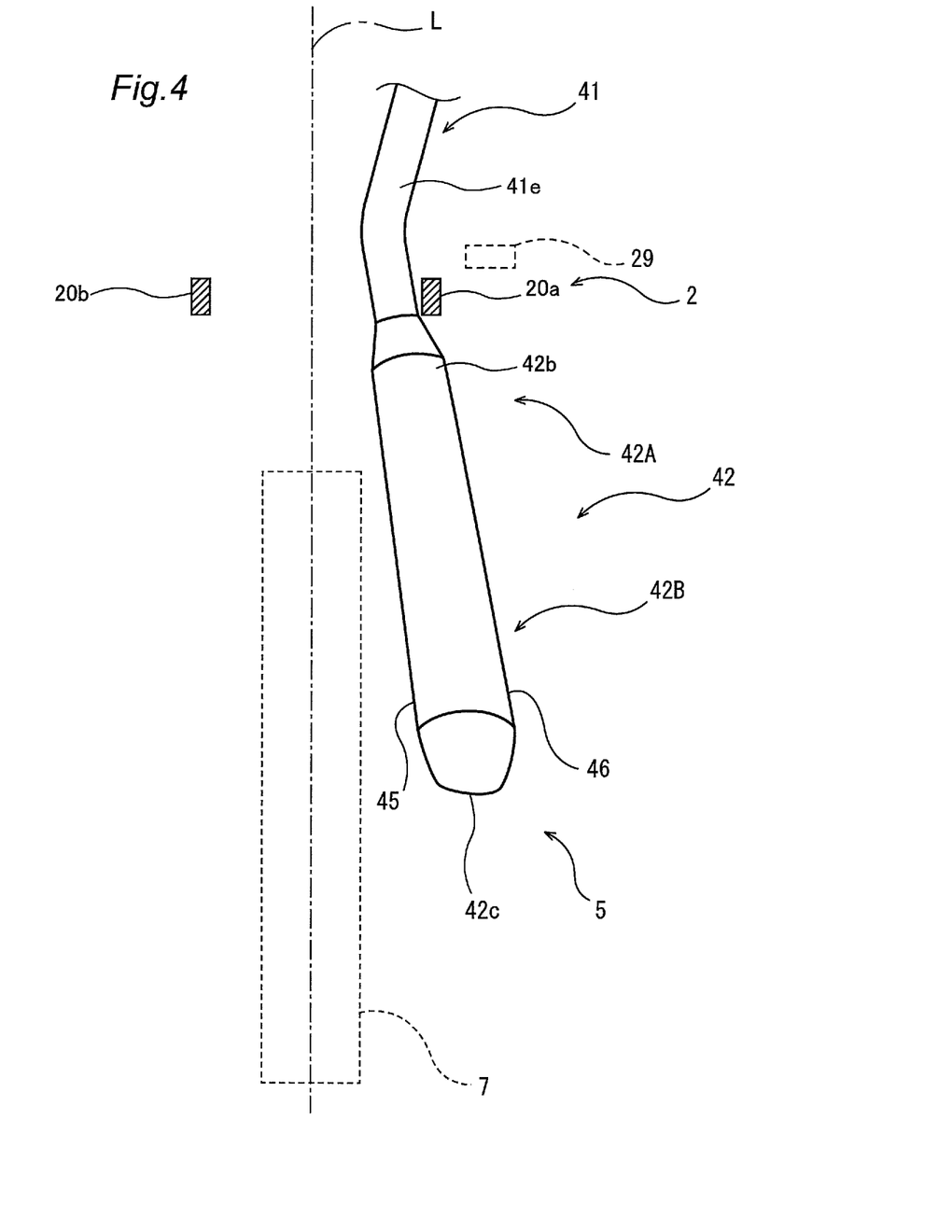
FIG. 4 is a schematic cross-sectional view taken along line P-P of FIG. 2, showing the positional relationship between the body frame and the exhaust system.

FIG. 4 is a schematic cross-sectional view taken along line P-P of FIG. 2, showing the positional relationship between the body frame 2 and the exhaust system 5. In FIG. 4, the exhaust system 5 is not hatched.

As shown in FIG. 4, the rear extending portion 41e of the exhaust pipe 41 extends from the right of the engine 3 rearwardly with respect to the vehicle and is bent in a vehicle width direction. More specifically, the rear extending portion 41e includes a front portion that gradually approaches the vehicle centerline L, and a rear portion that is gradually separated from the vehicle centerline L. The rear extending portion 41e is located between the first and second main frames 20a and 20b and closer to the first main frame 20a than to the second main frame 20b.

The silencer 42 is attached to the rear end of the rear extending portion 41e of the exhaust pipe 41. The silencer 42 is a generally cylindrical component with a diameter larger than that of the exhaust pipe 41. As described below, the silencer 42 and the rear extending portion 41e of the exhaust pipe 41 are fixed to the first main frame 20a.

The silencer 42 is a cylindrical metal component with an outer diameter larger than that of the exhaust pipe 41. As shown in FIGS. 2 and 3, the silencer 42 includes a cylindrical external cylinder body 42a and a diffuser 42b having a diameter gradually increasing as it goes along the axis of the cylinder. Although not shown, the silencer 42 includes an internal cylinder connected with the exhaust pipe 41, a sound absorbing material covering the internal cylinder and other components located therein.

The external cylinder body 42a constitutes a portion of the front portion 42A of the silencer 42, and the rear portion 42B. An exhaust outlet 42c that discharges exhaust gases from the engine 3 to the outside is provided on the rear end of the external cylinder body 42a.

The diffuser 42b constitutes a portion of the front portion 42A of the silencer 42. The diffuser 42b has a diameter that decreases as it goes forward with respect to the vehicle, and connects the external cylinder body 42a with the exhaust pipe 41.

A portion of the exhaust system 5 is located rearward of the engine 3 and extends rearward with respect to the vehicle between the first and second main frames 20a and 20b (for convenience, this configuration will be hereinafter referred to as "through configuration of the exhaust system 5 between the main frames"). This configuration prevents the exhaust system 5 from contacting the foot of the rider placed on a foot rest 29 (see FIG. 4).

As shown in FIG. 4, the silencer 42 extends from the rear end of the rear extending portion 41e, which extends to a location close to the left side of the first main frame 20a, rearwardly with respect to the vehicle so as to be separated from the vehicle centerline L. The silencer 42 is disposed so as not to overlap the rear wheel 7 as viewed from above, and thus does not contact the rear wheel 7 which swings while the vehicle is traveling.

Thus, as shown in FIGS. 3 and 4, the silencer 42 is prevented from contacting the rear wheel 7 and still the silencer 42 as a whole is located as close as possible to the vehicle centerline L, thus concentrating the mass of the motorcycle 1 as measured in a vehicle width direction.

The front and rear portions 42A and 42B of the silencer 42 are attached to the body frame 2 such that the silencer 42 is located below the first rear frame 30a. An arrangement to attach the silencer 42 will be detailed below.

Next, the construction of the first and second rear frames 30a and 30b will be described.

Returning to FIG. 2, the first rear frame 30a includes a first upper frame 31a and a first lower frame 32a. The first upper frame 31a extends from the first main frame 20a rearwardly with respect to the vehicle, with the front end 33A connected with the first main frame 20a. The first lower frame 32a extends rearward with respect to the vehicle from the first main frame 22a below the first upper frame 31a, with the front end 33B connected with the first main frame 20a below the front end 33A. Rear portions of the first upper frame 31a and first lower frame 32a are connected with each other. Thus, the first upper frame 31a, the first lower frame 32a and a portion of the first main frame 20a form a generally triangular frame structure as viewed from a side of the vehicle, located to the right with respect to the vehicle.

The second rear frame 30b includes a second upper frame 31b and a second lower frame 32b. The second upper frame 31b extends from the second main frame 20b rearwardly with respect to the vehicle, with the front end 34A connected with the second main frame 20b. The second lower frame 32b extends rearward with respect to the vehicle from the second main frame 20b below the second upper frame 31b, with the front end 34B connected with the second main frame 20b below the front end 34A. Rear portions of the second upper frame 31b and second lower frame 32b are connected with each other. Thus, the second upper frame 31b, the second lower frame 32b and a portion of the second main frame 20b define a generally triangular frame structure as viewed from a side of the vehicle, located to the left with respect to the vehicle.

The first and second upper frames 31a and 31b are connected with each other by a pair of connecting plates 28a and 28b extending in a vehicle width direction and arranged in a front-to-rear direction with respect to the vehicle.

The first lower frame 32a is connected with the first main frame 20a such that its angle with the first upper frame 31a as viewed from a side of the vehicle is not greater than half the angle defined by the second lower frame 32b and second upper frame 31b, for example. As shown in FIG. 3, as viewed from above the vehicle, the first lower frame 32a has an angle with the first upper frame 31a that is smaller than the angle defined by the second lower frame 32b and second upper frame 31b.

Next, an arrangement to attach the silencer 42 will be described with reference to FIGS. 2 to 6.

Figure 5:
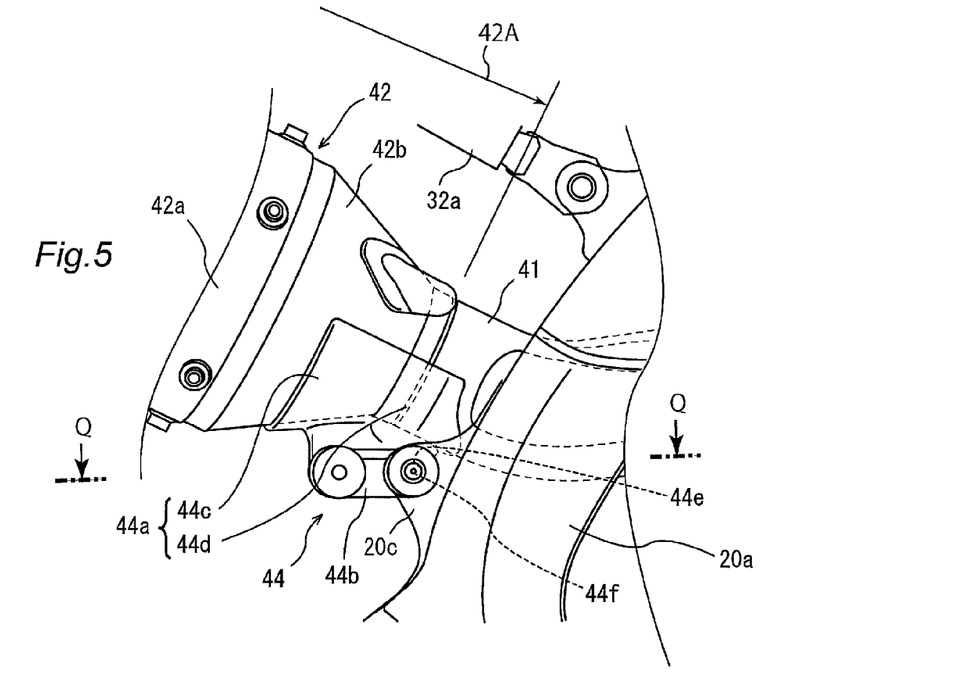
FIG. 5 is an enlarged view of an arrangement that connects the silencer with the main frame.
Figure 6:
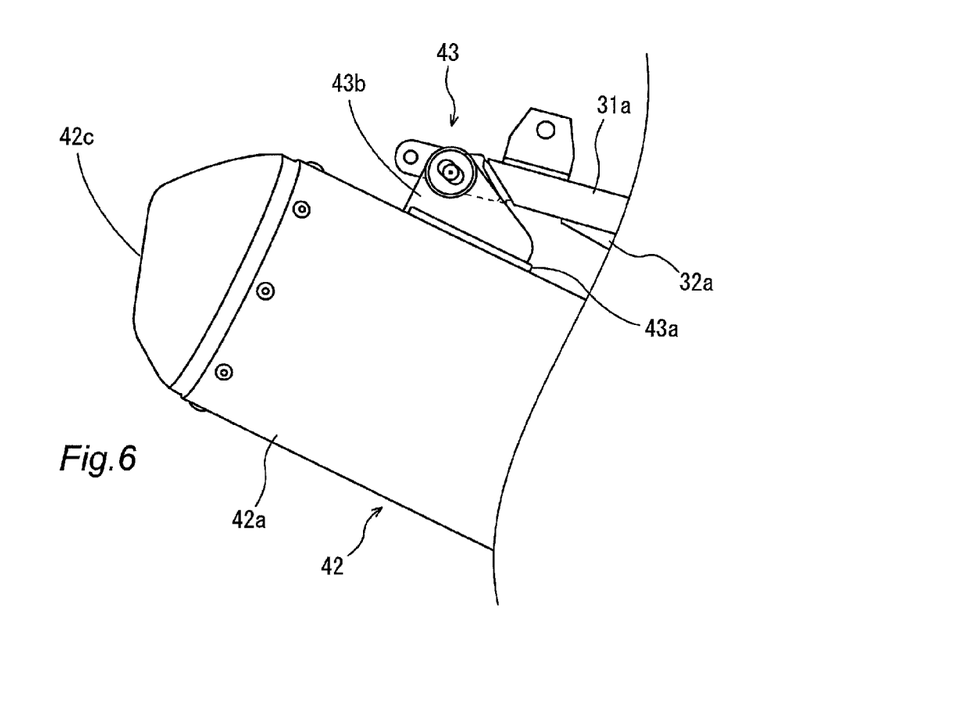
FIG. 6 is an enlarged view of an arrangement that connects the silencer with the upper frame.

FIG. 5 is an enlarged side view of an arrangement that connects the silencer 42 with the first main frame 20*a*, and FIG. 6 is an enlarged side view of an arrangement that connects the silencer 42 with the first upper frame 31*a*.

As shown in FIG. 2, the silencer 42 is disposed to overlap a portion of the second lower frame 32*b* as viewed from a side of the vehicle. The front portion 42A of the silencer 42, together with the rear extending portion 41*e* of the exhaust pipe 41, is connected with the first main frame 20*a*, while the rear portion 42B of the silencer is connected with the first rear frame 30*a*.

A rear bracket 43 is located on the rear portion 42B of the silencer 42. The rear bracket 43 is secured to an upper surface of the rear of the external cylinder body 42*a* by welding, for example. As shown in FIG. 3, the rear bracket 43 is at a location on the silencer 42 close to the vehicle centerline L as viewed from above the vehicle.

As viewed from above the vehicle, out of a pair of side lines of the silencer 42 extending in a front-to-rear direction with respect to the vehicle, the one close to the vehicle centerline L will be referred to as inner side line 45, while the other one as the outer side line 46.

As shown in FIGS. 2, 3 and 6, the rear bracket 43 includes a base 43*a* welded to the external surface of the external cylinder body 42*a* of the silencer 42, and a rear support member 43*b* extending upward from the base 43*a*. A bolt hole is provided in the rear support member 43*b*, and a bolt passing through this bolt hole connects the rear bracket 43 with the rear end of the first upper frame 31*a*. With this arrangement, the rear support member 43*b*, located between the rear portion 42B of the silencer 42 and the first rear frame 30*a*, supports the exhaust system 5 on the first rear frame 30*a*. The rear end of the first lower frame 32*a* is connected with a location on the first upper frame 31*a* that is forward of its rear end. As such, the rear end of the first upper frame 31*a* projects rearward with respect to the vehicle from its connection with the first lower frame 32*a*.

As shown in FIGS. 2 and 5, the diffuser 42*b* of the silencer 42 and the rear extending portion 41*e* of the exhaust pipe 41 are supported by a front bracket (i.e. the support bracket) 44 from below. More specifically, the front bracket 44 is secured to bottom surfaces of the diffuser 42*b* and the rear extending portion 41*e* of the exhaust pipe 41 by welding, for example. The front bracket 44 is fixed to the first main frame 20*a* below the connection point between the first rear frame 30*a* and first main frame 20*a*. Thus, the silencer 42 and exhaust pipe 41 are connected with the first main frame 20*a* below the connection point between the first rear frame 30*a* and first main frame 20*a*.

As shown in FIG. 5, the front bracket 44 includes a generally semicylindrical support member 44*a* covering the lower half of portions of the diffuser 42*b* and exhaust pipe 41, and a front support member 44*b* to connect the support member 44*a* with the first main frame 20*a*. The front support member 44*b* is located below the support member 44*a* and integral with it, and has a bolt hole 44*e* provided therein. The front bracket 44 is fixed to a flange 20*c* provided on the first main frame 20*a* by a bolt 44*f* passing through the bolt hole 44*e* in the front support member 44*b* (see FIG. 7).

As shown in FIG. 5, the support member 44*a* includes a diffuser support portion 44*c* that support the diffuser 42*b* of the silencer 42 from below, and an exhaust pipe support portion 44*d* that supports the exhaust pipe 41 from below. The diffuser support portion 44*c* is tapered with a diameter gradually changing in conformity with the changing outer diameter of the diffuser 42*b*. The exhaust pipe support portion 44*d* is semicylindrical to cover the lower half of a portion of the exhaust pipe 41. The diffuser support portion 44*c*, exhaust pipe support portion 44*d* and front support member 44*b* are integrally formed.

With this arrangement, the front support member 44*b*, located between the front portion 42A of the silencer 42 and the rear extending portion 41*e* of the exhaust pipe 41 and the first rear frame 20*a*, supports the exhaust system 5 on the first rear frame 20*a*.

Figure 7:
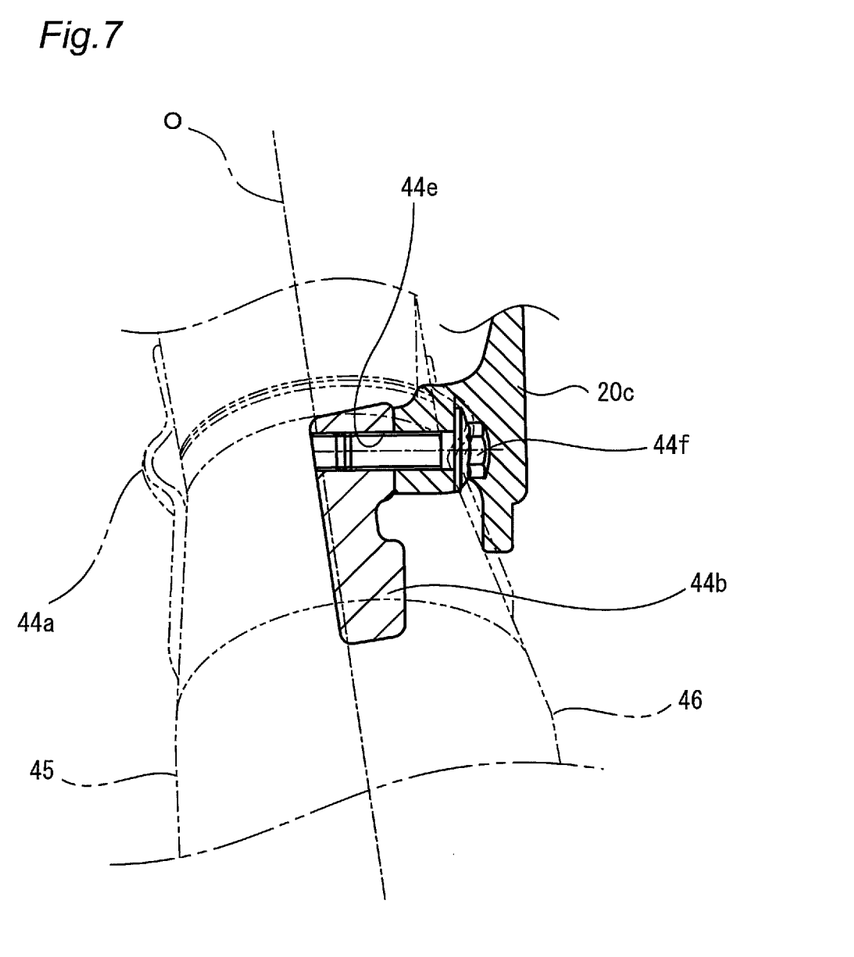
FIG. 7 is a cross-sectional view taken along line Q-Q of FIG. 5.
Figure 8:
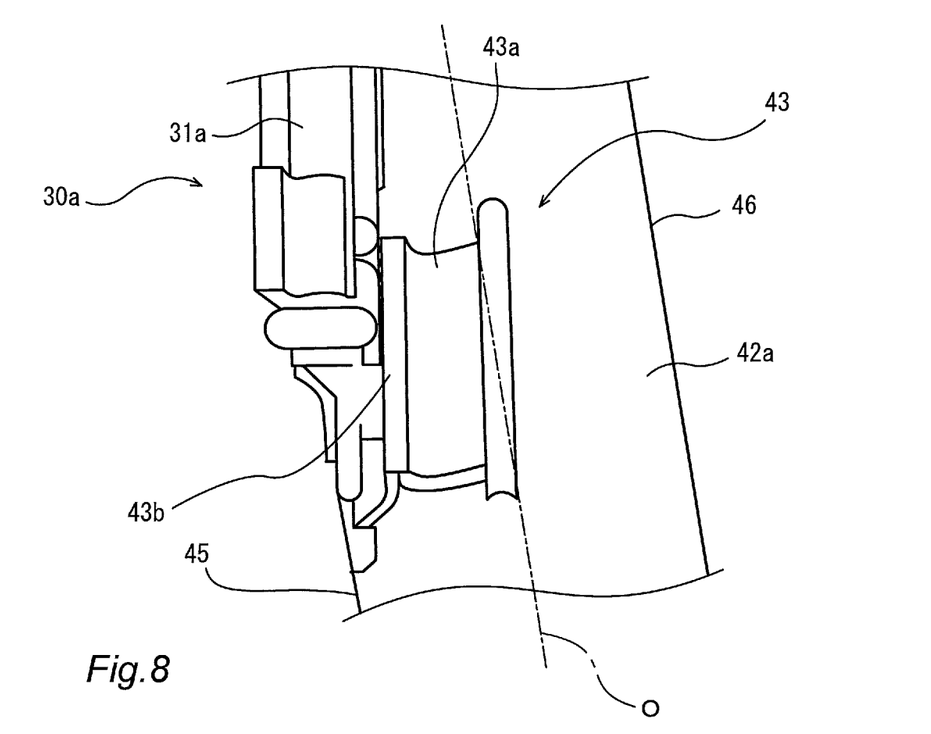
FIG. 8 is an enlarged view of the main portion R of FIG. 3.

FIG. 7 is a cross-sectional view taken along line Q-Q in FIG. 5. FIG. 8 is an enlarged view of the main portion R of FIG. 3. Character O in FIGS. 7 and 8 designates the cylinder axis of the silencer 42.

As shown in FIG. 7, as viewed from above the vehicle, the front support member 44*b* overlaps the cylinder axis O and is located closer to the outer side line 46 than the inner side line 45. As shown in FIG. 8, as viewed from above the vehicle, the rear support member 43*b* is located between the inner side line 45 and the cylinder axis O and is located closer to the inner side line 45 than the outer side line 46.

Next, how the mass of the vehicle is concentrated by positioning the exhaust system 5 and a certain strength of the first rear frame 30*a* is ensured will be described.

The first and second rear frames 30*a* and 30*b* are provided to ensure a certain strength and rigidity of a rear portion of the motorcycle 1. Thus, the left and right rear frames are typically in left-right symmetry. However, in the motorcycle 1 of the present preferred embodiment, as shown in FIG. 2, the first lower frame 32*a* is located higher than the second lower frame 32*b*. More specifically, as viewed from a side of the vehicle, the first lower frame 32*a* is connected with the first main frame 20*a* at a location higher than the connection point between the second lower frame 32*b* and second main frame 20*b*. This leaves a space in which the silencer 42 may be disposed below the first lower frame 32*a*, more forward than in implementations where the first and second lower frames 32*a* and 32*b* are in left-right symmetry. As the silencer 42 is located in this space, the silencer 42 overlaps a portion of the second lower frame 32*b* as viewed from a side of the vehicle.

Thus, the silencer 42 is located closer to the center of gravity of the motorcycle 1 (i.e. on the engine 3), thus concentrating the mass of the motorcycle 1. Further, disposing the silencer 42 so as to extend along the first lower frame 32*a* such that the proportion of the silencer 42 in the space is relatively large, as in the present preferred embodiment, will allow the space to be used effectively and the mass of the vehicle to be concentrated more efficiently.

The above described arrangement, in which the first lower frame 32*a* is connected with the first main frame 20*a* at a location higher than the second lower frame 32*b* as viewed from a side of the vehicle, decreases the strength of the first rear frame 30*a* including the first upper frame 31*a* and first lower frame 32*a*. That is, a certain strength of the first rear frame 30*a* is ensured by connecting the first lower frame 32*a* with the first main frame 20*a* at a location that is sufficiently lower than the connection point between the first upper frame 31*a* and first main frame 20*a*, similar to the second lower frame 32*b*. Consequently, if the first lower frame 32*a* is connected with the first main frame 20*a* at a location higher than the second lower frame 32*b* as viewed from a side of the vehicle, the strength of the first rear frame 30*a* is lower than that of the second rear frame 30*b*.

To address this shortcoming, in the present preferred embodiment, the front portion 42A of the silencer 42 and the exhaust pipe 41 is connected with the first main frame 20*a* and the rear portion 42B of the silencer 42 is connected with the first rear frame 30*a* such that the silencer 42 and the exhaust pipe 41 significantly reinforce the first rear frame 30*a*. That is, a load received by the first rear frame 30a is also received by the silencer 42 and exhaust pipe 41. In other words, the entire first rear frame 30a, exhaust pipe 41 and silencer 42 define a generally triangular frame structure, which is capable of supporting the load of the seat 9, rear fender 11 and other elements. Thus, the strength of the first lower frame 32a is supplemented by the silencer 42 and exhaust pipe 41.

Further, as a bottom surface of the diffuser 42b of the silencer 42 is connected with the first main frame 20a and a top surface of the rear portion 42B of the silencer 42 is connected with the first upper frame 31a, the silencer 42 is less likely to be displaced in a top-to-bottom direction with respect to the vehicle when receiving an external force. Thus, the support rigidity for the silencer 42 in a top-to-bottom direction with respect to the vehicle is improved. Moreover, the silencer 42, which has a larger outer diameter than the exhaust pipe 41, supplements the strength of the first rear frame 30a.

Further, a bottom surface of the diffuser 42b of the silencer 42 and the rear extending portion 41e of the exhaust pipe 41 are supported by the front bracket 44 and thus connected with the first main frame 20a, while a top surface of the rear portion 42B of the silencer 42 is connected with the first upper frame 31a by the rear bracket 43. Thus, the diffuser 42b and exhaust pipe 41, and the rear portion 42B of the silencer 42 are securely supported in a top-to-bottom direction with respect to the vehicle.

Further, the diffuser 42b of the silencer 42 together with the rear extending portion 41e of the exhaust pipe 41 is located close to the main frame 20a, and the rear extending portion 41e and diffuser 42b are connected with the first main frame 20a. This makes it possible to concentrate the mass of the vehicle in a vehicle width direction and in a front-to-rear direction with respect to the vehicle, reduce the possibility of the exhaust system contacting the foot of the rider and improve the discharge performance of the exhaust system.

More specifically, as discussed above, the motorcycle 1 uses a through configuration of the exhaust system 5 between the main frames in order to concentrate the mass of the vehicle as measured in a vehicle width direction while preventing the silencer 42 and rear wheel 7 from contacting each other and preventing the exhaust system 5 from contacting the foot of the rider.

In the case of a through configuration of the exhaust system 5 between the main frames, if the external cylinder body 42a is to be positioned close to the first main frame 20a and to be connected with the first main frame 20a, either the entire silencer 42 must retain the same posture and be brought closer to the vehicle centerline L, or the posture of the silencer 42 must be changed such that the rear portion 42A of the silencer 42 is significantly farther from the vehicle centerline L. In the former case, the front portion 42A of the silencer 42 may contact the rear wheel 7. In the latter case, the mass of the vehicle cannot be concentrated as measured in a vehicle width direction, and the angle at which the exhaust pipe 41 connected with the silencer 42 is bent is increased, deteriorating the discharge performance.

Also, in the case of a through configuration of the exhaust system 5 between the main frames, the exhaust pipe 41 preferably is extended to behind the first main frame 20a and connected with the first main frame 20a. In this arrangement, the silencer 42 is located more rearward with respect to the vehicle than in the present preferred embodiment, limiting the possibility of concentrating the mass of the vehicle in a front-to-rear direction with respect to the vehicle.

If, in contrast, the diffuser 42b is positioned close to the first main frame 20a and is connected with the first main frame 20a, as in the present preferred embodiment, the exhaust system 5 is prevented from contacting the foot of the rider and, since the posture of the silencer 42 remains unchanged, the mass of the vehicle is concentrated in a vehicle width direction. Moreover, since the angle at which the exhaust pipe 41 is bent is not increased, the exhaust system 5 has a good discharge performance. Furthermore, since the silencer 42 is positioned more forward with respect to the vehicle by the amount that would be required if the exhaust pipe 41 were located behind the first main frame 20a, the mass of the vehicle is concentrated as measured in a front-to-rear direction with respect to the vehicle.

Further, as the support member 44a preferably includes the diffuser support portion 44c and the exhaust pipe support portion 44d, as discussed above, the lower half of portions of the diffuser 42b of the silencer 42 and the exhaust pipe 41 are covered. This allows a load and moment acting mainly on a lower portion of the diffuser 42b of the silencer 42 to be securely received, while improving the support rigidity for the silencer 42.

Further, as discussed above, the front support member 44b is located closer to the outer side line 46 than the inner side line 45 of the silencer 42, and the rear support member 43b is located closer to the inner side line 45 than the outer side line 46. Thus, the silencer 42 and exhaust pipe 41 are supported from both sides thereof disposed in a vehicle width direction, improving the support rigidity for the silencer 42 and exhaust pipe 41.

Thus, in the present preferred embodiment, the motorcycle 1 preferably includes the engine 3, the first main frame 20a extending in top-to-bottom and front-to-rear directions with respect to the vehicle and supporting the engine 3, the first rear frame 30a extending from the first main frame 20a rearwardly with respect to the vehicle and connected with the first main frame 20a in at least two locations, the exhaust pipe 41 that discharges exhaust gases from the engine 3 to the outside, and the silencer 42 attached to a rear portion of the exhaust pipe 41, at least a portion of the silencer 42 being located below the first rear frame 30a. The rear portion 42B of the silencer 42 is connected with the first rear frame 20a. At least one of a front portion 42A of the silencer 42 and the exhaust pipe 41 is connected with the first main frame 20a below the first rear frame 30a.

The front portion 42A of the silencer 42 and the exhaust pipe 41 are connected with the first main frame 20a, while the rear portion 42B of the silencer 42 is connected with the first rear frame 30a such that the silencer 42 and exhaust pipe 41 reinforce the first rear frame 30a.

Moreover, at least one of the front portion 42A of the silencer 42 and the exhaust pipe 41 is connected with the first main frame 20a below the connection point between the first rear frame 30a and first main frame 20a such that the silencer 42 and exhaust pipe 41, or the silencer 42 firmly support(s) the first rear frame 30a from below. Thus, the silencer 42 and exhaust pipe 41, or the silencer 42 sufficiently supplement(s) the strength of the first rear frame 30a.

Thus, the lower one of the at least two connection points of the first rear frame 30a with the first main frame 20a is shifted upward and the silencer 42 is positioned closer to the center of gravity of the motorcycle 1, thus concentrating the mass of the vehicle. In other words, the above arrangement increases the freedom of design of the first rear frame 30a and the freedom of layout of the silencer 42.

Further, since the two ends of the silencer 42 disposed in a front-to-rear direction with respect to the vehicle is fixed to the body frame 2, the support rigidity for the silencer 42 is improved compared to implementations where the silencer is supported at one end. This prevents the silencer 42 from swinging significantly while the motorcycle 1 is traveling, thus improving the handling feel of the motorcycle 1.

Since in the present preferred embodiment, the front portion 42A of the silencer 42 is connected with the first main frame 20a, the front and rear portions 42A and 42B of the silencer 42 are connected with the body frame 2. Thus, the silencer 42 is directly connected with the body frame 2 at its front and rear portions. Consequently, the silencer 42, which is one structure, serves as reinforcement for the first rear frame 30a in a more reliable manner. This reinforces the first rear frame 30a more reliably.

Since the rear extending portion 41e of the exhaust pipe 41 is connected with the first main frame 20a, the rear extending portion 41e of the exhaust pipe 41 and the rear portion 42B of the silencer 42 are connected with the body frame 2. Thus, the exhaust pipe 41, which has a higher freedom of layout than the silencer 42, is also connected with the first main frame 20a such that the silencer 42 and exhaust pipe 41 reinforce the first rear frame 30a. This makes it possible to provide flexibility in the layout of the exhaust system 5, allowing the silencer 42 to be connected with the first main frame 20a in a more reliable manner.

Further, since the silencer 42 and exhaust pipe 41 are connected with the first main frame 20a, the stress experienced when an external force acts thereon is dispersed compared with implementations where only one of the silencer 42 and exhaust pipe 41 is connected with the first main frame 20a.

In the present preferred embodiment, the motorcycle 1 further includes the rear bracket 43 that connects the top surface of the rear portion 42B of the silencer 42 with the first rear frame 30a and the front bracket 44 that supports, from below, at least one of the front portion 42A of the silencer 42 and the exhaust pipe 41 on the first main frame 20a.

Thus, the silencer 42 is supported at top and bottom surfaces thereof, improving the support rigidity for the silencer 42 in a top-to-bottom direction with respect to the vehicle and in a vehicle width direction. Thus, the silencer 42 is more reliably prevented from being displaced significantly in a top-to-bottom direction with respect to the vehicle and in a vehicle width direction while the motorcycle 1 is traveling. This allows the silencer 42 and exhaust pipe 41 to follow the behavior of the entire motorcycle 1 without delay, thus improving the handling feel of the motorcycle 1.

Moreover, the motorcycle includes the front bracket 44 to support bottom surfaces of the diffuser 42b of the silencer 42 and the rear extending portion 41e of the exhaust pipe 41. Thus, the front bracket 44 more reliably receives a load or moment acting on lower portions of the diffuser 42b of the silencer 42 and the rear extending portion 41e of the exhaust pipe 41, and the support rigidity for the silencer 42 is significantly improved.

In the present preferred embodiment, the diffuser 42b is connected with the first main frame 20a. This makes it possible to concentrate the mass of the vehicle in a vehicle width direction and in a front-to-rear direction with respect to the vehicle, reduce the possibility of the exhaust system 5 contacting the foot of the rider and improve the discharge performance of the exhaust system 5.

In the present preferred embodiment, the front support member 44b is located closer to the outer side line 46 of the silencer 42 than the inner side line 45 thereof, and the rear support member 43b is located closer to the inner side line 45 of the silencer 42 than the outer side line 46 thereof. Thus, the silencer 42 and exhaust pipe 41 are supported at both sides thereof disposed in a vehicle width direction, improving the support rigidity for the silencer 42 and exhaust pipe 41. Consequently, the silencer 42 and exhaust pipe 41 is prevented from being displaced significantly in a vehicle width direction while the motorcycle 1 is traveling. Thus, the silencer 42 and exhaust pipe 41 is more reliably prevented from swinging significantly in a vehicle width direction while the motorcycle 1 is traveling. Further, the silencer 42 and exhaust pipe 41 follow the behavior of the entire motorcycle 1 without delay, thus improving the handling feel of the motorcycle 1.

In the present preferred embodiment, the first rear frame 30a includes the first upper frame 31a extending from the first main frame 20a rearwardly with respect to the vehicle, and the first lower frame 32a located below the first upper frame 31a and extending from the first main frame 20a rearwardly with respect to the vehicle to be connected with a rear portion of the first upper frame 31a. Thus, the first rear frame 30a is implemented by a simple arrangement.

In the present preferred embodiment, the motorcycle 1 further includes the second main frame 20b located such that the first and second main frames 20a and 20b are arranged in a vehicle width direction, the second main frame 20b extending in top-to-bottom and front-to-rear directions with respect to the vehicle to support the engine 3, and the second rear frame 30b located such that the first and second rear frames 30a and 30b are arranged in a vehicle width direction, the second rear frame 30b extending from the second main frame 20b rearwardly with respect to the vehicle and connected with the second main frame 20b in at least two locations. The second rear frame 30b includes the second upper frame 31b extending from the second main frame 20b rearwardly with respect to the vehicle, and the second lower frame 32b located below the second upper frame 31b and extending from the second main frame 20b rearwardly with respect to the vehicle and connected with a rear portion of the second upper frame 31b. At least a portion of the first lower frame 32a is located higher than the second lower frame 32b as viewed from a side of the vehicle.

Thus, the first and second rear frames 30a and 30b are in an asymmetrical arrangement. As such, a space in which the silencer 42 is disposed is preferably provided below the first lower frame 32a, for example. However, in this arrangement, at least a portion of the first lower frame 32a is located higher than the second lower frame 32b as viewed from a side of the vehicle, resulting in decreased strength of the right half of the rear of the vehicle.

In contrast, as the rear portion 42B of the silencer 42 is connected with the first rear frame 30a and at least one of the front portion 42A of the silencer 42 and the exhaust pipe 41 is connected with the first main frame 20a, the silencer 42 and exhaust pipe 41, or the silencer 42, reinforce(s) the first rear frame 30a. As such, even though the first and second rear frames 30a and 30b are in an asymmetrical arrangement, the silencer 42 and exhaust pipe 41, or the silencer 42, prevents any decrease in the strength of the rear of the vehicle and any decrease in its rigidity.

In the present preferred embodiment, the silencer 42 is positioned so as to overlap at least a portion of the second lower frame 32b as viewed from a side of the vehicle. This allows the silencer 42 to be positioned below the first lower frame 32a, which is located higher than the second lower frame 32b, as viewed from a side of the vehicle. This allows the silencer 42 to be positioned closer to the center of gravity of the vehicle, allowing the mass of the motorcycle 1 to be concentrated as measured in a front-to-rear direction with respect to the vehicle.

In the present preferred embodiment, a portion of the exhaust system 5 is located rearward of the engine 3 and extends rearward with respect to the vehicle between the first and second main frames 20a and 20b, and the silencer 42 is disposed so as not to overlap the rear wheel 7 as viewed from above the vehicle. This makes it possible to prevent the silencer 42 from contacting the rear wheel 7 and prevent the exhaust system 5 from contacting the foot of the rider, and to concentrate the mass of the motorcycle 1 as measured in a vehicle width direction.

Other Preferred Embodiments

While a preferred embodiment of the present invention has been described, the above preferred embodiment is merely an example that may be used to carry out the present invention. Thus, the present invention is not limited to the above preferred embodiment, and the above preferred embodiment may be modified as necessary without departing from the spirit of the present invention.

In the preferred embodiment illustrated above, the diffuser 42b of the silencer 42 preferably is supported by the front bracket 44 from below, while an upper surface of the rear of the external cylinder body 42a of the silencer 42 is supported by the rear bracket 43. However, the front and rear brackets 43 and 44 may support the silencer 42 in a different direction and at a different location. Further, the front bracket 44 may support the exhaust pipe 41 only, or support the silencer 42 only.

In the preferred embodiment illustrated above, the silencer 42 is preferably located on the right side of the vehicle as viewed from above the vehicle. Alternatively, the silencer 42 may be located on the left side of the vehicle. In this case, the second lower frame 32b located to the left with respect to the vehicle is suitably shifted in position similar to the first lower frame 32a of the above preferred embodiment.

Furthermore, silencers 42 may be provided on the right side and left side of the vehicle to increase the strength of the left and right rear frames.

In the preferred embodiment illustrated above, the engine 3 preferably takes in air from the front and discharges gases to the rear. Alternatively, the engine 3 may take air from the rear and discharges gases to the front.

In the preferred embodiment illustrated above, the body frame 2 preferably is a cradle frame; alternatively, it may be a body frame other than a cradle frame.

In the preferred embodiment illustrated above, the upper frames 31a and 31b and lower frames 32a and 32b preferably are separate components; alternatively, each of the first and second rear frames 30a and 30b may be constituted by an integral frame. More specifically, each of the first and second rear frames 30a and 30b may have any configuration as long as each rear frame is connected with the first or second main frame 20a or 20b at two points.

In the preferred embodiment illustrated above, the entire silencer 42 preferably is located below the first rear frame 30a. However, the present invention may be suitably used if, for example, a portion of the silencer 42 is located below the first rear frame 30a because, in this case, an attempt to concentrate the mass of the vehicle as measured in a front-to-rear direction with respect to the vehicle would cause the silencer to contact the first rear frame 30a.

In the preferred embodiment illustrated above, the front support member 44b preferably is positioned to overlap the cylinder axis O, while the rear support member 43b is positioned between the inner side line 45 and cylinder axis O. However, as long as the front support member 44b is located closer to the inner side line 45 than the outer side line 46 and the rear support member 43b is located closer to the outer side line 46 than the inner side line 45, the members support the exhaust system 5 at both sides thereof disposed in a vehicle width direction, thus improving the support rigidity. For example, the front support member 44b may be located on the inner side line 45 and the rear support member 43b may be located on the outer side line 46.

While the above preferred embodiment does not mention the cross section of the first and second lower frames 32a and 32b, the first lower frame 32a may have a smaller cross section in a vehicle width direction than the second lower frame 32b. Even with this arrangement, the use of the silencer 42 and exhaust pipe 41, or of the silencer 42, as reinforcement, as described above, prevents any decreases in the strength and rigidity of the first rear frame 30a.

That is, the present invention may be provided in arrangements where the first lower frame 32a has at least one of a smaller rigidity and a smaller strength than the second lower frame 32b. For example, in an attempt to use a material of high workability or low cost, the first lower frame 32a may be made of a material having a smaller strength or rigidity than the second lower frame 32b; even in such implementations, the use of the silencer 42 and exhaust pipe 41, or of the silencer 42, as reinforcement, as described above, will prevent decrease in the strength and rigidity of the first rear frame 30a. Thus, the present invention allows for various designs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type vehicle comprising:
   an engine;
   a body frame supporting the engine; and
   an exhaust system configured to discharge exhaust gases from the engine to an outside; wherein
   the body frame includes a first main frame extending in top-to-bottom and front-to-rear directions with respect to the vehicle and a first rear frame extending from the first main frame rearwardly with respect to the vehicle and connected with the first main frame in at least two locations;
   the exhaust system includes an exhaust pipe connected with the engine and a silencer attached to a rear portion of the exhaust pipe;
   a rear portion of the silencer is connected with the first rear frame;
   at least one of a front portion of the silencer and the rear portion of the exhaust pipe is connected with the first main frame below the first rear frame;
   the first rear frame includes:
      a first upper frame extending from the first main frame rearwardly with respect to the vehicle; and
      a first lower frame located below the first upper frame and extending from the first main frame rearwardly with respect to the vehicle to be connected with a rear portion of the first upper frame;
   the body frame further includes:
      a second main frame located such that the first and second main frames are arranged in a vehicle width direction, the second main frame extending in the top-to-bottom and front-to-rear directions with respect to the vehicle to support the engine; and
      a second rear frame located such that the first and second rear frames are arranged in the vehicle width direction, the second rear frame extending from the second main frame rearwardly with respect to the vehicle and connected with the second main frame in at least two locations;

the second rear frame includes:
- a second upper frame extending from the second main frame rearwardly with respect to the vehicle; and
- a second lower frame located below the second upper frame and extending from the second main frame rearwardly with respect to the vehicle and connected with a rear portion of the second upper frame;

the first lower frame is connected to the first main frame at a location that is higher than a location where the second lower frame is connected to the second main frame;

the silencer is positioned opposite the second lower frame with respect to a vehicle centerline extending in the front-to-rear direction so that the silencer overlaps at least a portion of the second lower frame as viewed from the side of the vehicle;

at least a portion of the first lower frame is located higher than the second lower frame as viewed from a side of the vehicle; and at least a portion of the silencer is positioned below the first lower frame so as to overlap the first lower frame as viewed from above the vehicle.

2. The straddle-type vehicle according to claim 1, wherein the front portion of the silencer is connected with the first main frame.

3. The straddle-type vehicle according to claim 1, wherein the rear portion of the exhaust pipe is connected with the first main frame.

4. The straddle-type vehicle according to claim 1, wherein
- a top surface of the rear portion of the silencer is connected with the first rear frame; and
- a bottom surface of at least one of the front portion of the silencer and the rear portion of the exhaust pipe is connected with the first main frame.

5. The straddle-type vehicle according to claim 1, further comprising a support bracket configured to support a bottom surface of at least one of the front portion of the silencer and the rear portion of the exhaust pipe from below and connect the bottom surface with the first main frame.

6. The straddle-type vehicle according to claim 1, wherein the silencer includes:
- a cylindrical external cylinder body; and
- a diffuser provided at the front portion of the silencer to connect a front portion of the external cylinder body with the exhaust pipe; wherein the diffuser is connected with the first main frame.

7. The straddle-type vehicle according to claim 1, further comprising:
- a rear support member located between the rear portion of the silencer and the first rear frame to support the exhaust system on the first rear frame; and
- a front support member located between at least one of the front portion of the silencer and the rear portion of the exhaust pipe and the first main frame to support the exhaust system on the first main frame; wherein the front and rear support members are located, as viewed from above the vehicle, between an inner side line of the silencer close to the vehicle centerline and an outer side line thereof opposite the inner side line, the inner and outer side lines being arranged in the vehicle width direction;

the front support member is located closer to the outer side line than the inner side line; and the rear support member is located closer to the inner side line than the outer side line.

8. The straddle-type vehicle according to claim 1, wherein
- a portion of the exhaust system is located rearward of the engine and extends rearward with respect to the vehicle between the first and second main frames; and the silencer is gradually separated from the vehicle centerline, beginning from the front portion of the silencer toward the rear portion thereof, such that the silencer does not overlap a rear wheel as viewed from above the vehicle.

9. The straddle-type vehicle according to claim 1, wherein the first lower frame has a smaller cross section in the vehicle width direction than the second lower frame.

10. The straddle-type vehicle according to claim 1, wherein the first lower frame has at least one of a smaller rigidity and a smaller strength than the second lower frame.

11. The straddle-type vehicle according to claim 1, wherein the silencer is positioned so as not to overlap any portion of the first lower frame as viewed from the side of the vehicle.

* * * * *